United States Patent
Kimball et al.

(10) Patent No.: US 11,344,942 B2
(45) Date of Patent: May 31, 2022

(54) ACTUATOR-BASED COMPENSATION FOR DEFORMATION OF A MANDREL

(71) Applicant: THE BOEING COMPANY, Chicago, IL (US)

(72) Inventors: Nicklaus Cummings Kimball, Mesa, AZ (US); Michael John McNulty, Scottsdale, AZ (US); Robert Loftus, Gilbert, AZ (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 16/419,190

(22) Filed: May 22, 2019

(65) Prior Publication Data

US 2020/0368803 A1    Nov. 26, 2020

(51) Int. Cl.
*B29C 70/32* (2006.01)
*B21D 22/16* (2006.01)
*B29L 31/30* (2006.01)

(52) U.S. Cl.
CPC .............. *B21D 22/16* (2013.01); *B29C 70/32* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 5,266,137 A | 11/1993 | Hollingsworth | |
| 6,692,681 B1 | 2/2004 | Lunde | |
| 6,745,101 B2 | 6/2004 | Anderson et al. | |
| 7,083,698 B2 | 8/2006 | Engwall et al. | |
| 8,277,716 B2 * | 10/2012 | Galle | B29C 53/821 |
| | | | 264/281 |
| 2008/0156436 A1 | 7/2008 | Johnson et al. | |
| 2012/0023725 A1* | 2/2012 | Parfrey | B29C 53/8075 |
| | | | 29/428 |

FOREIGN PATENT DOCUMENTS

WO    199904952    2/1999

* cited by examiner

*Primary Examiner* — Jeffry H Aftergut

(57) ABSTRACT

A system to manufacture an object includes a headstock, a tailstock, and a mandrel having a first end coupled to the headstock and a second end coupled to the tailstock. The system also includes an actuator coupled to one or more of the headstock, the tailstock, or the mandrel, the actuator operable to apply a force to the one or more of the headstock, the tailstock, or the mandrel, to oppose deformation of the mandrel.

20 Claims, 6 Drawing Sheets

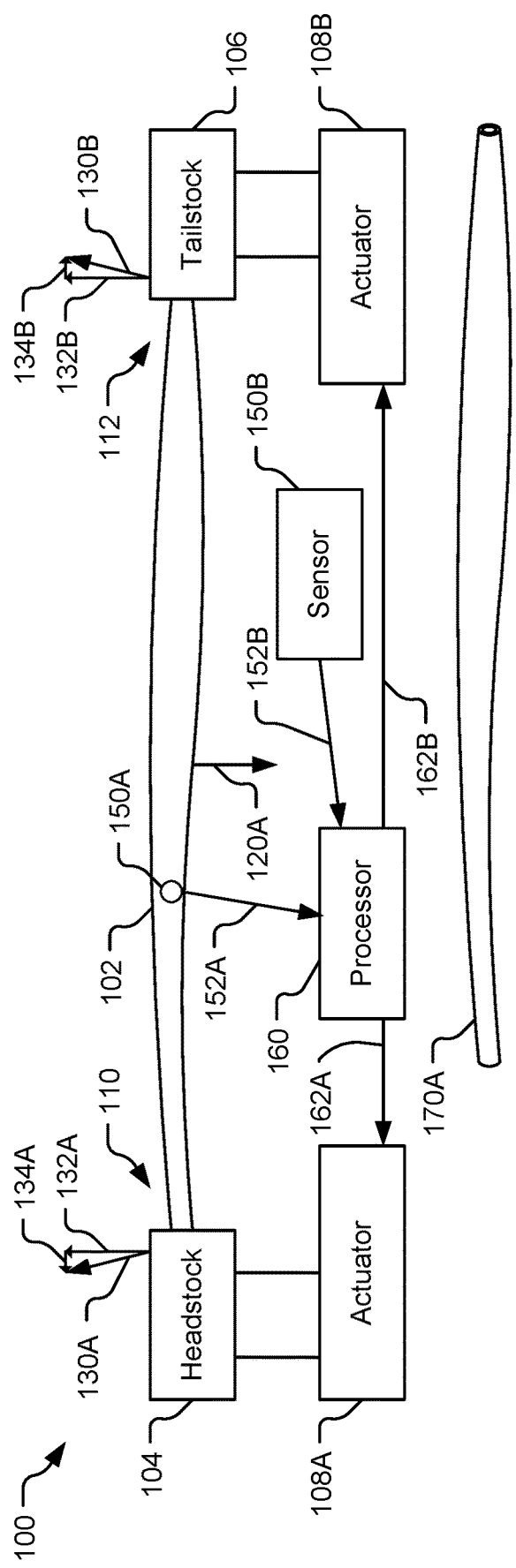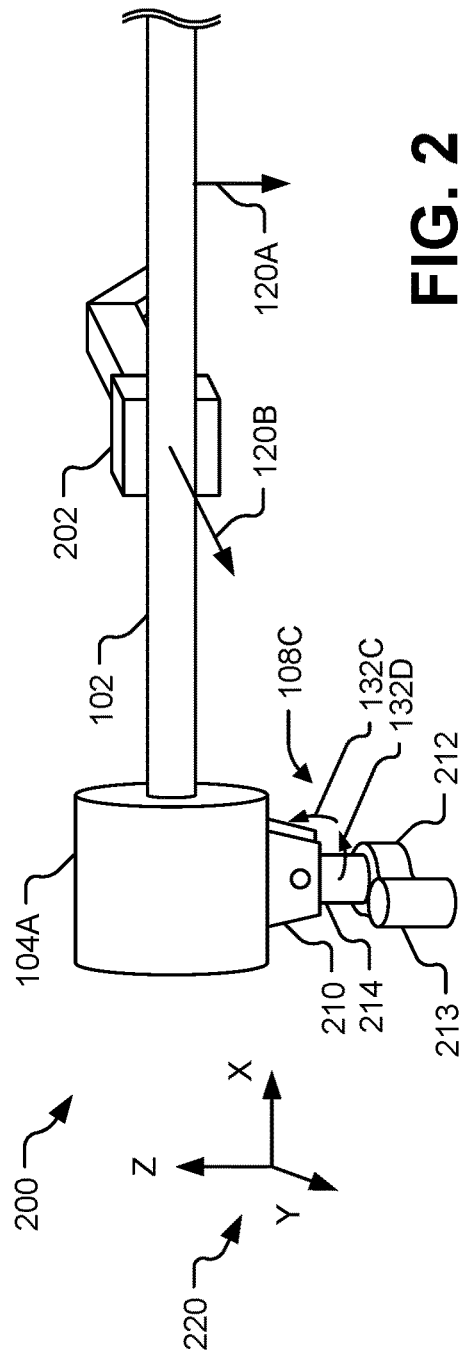
FIG. 1
FIG. 2

ACTUATOR-BASED COMPENSATION FOR DEFORMATION OF A MANDREL

FIELD OF THE DISCLOSURE

The present disclosure is generally related to manufacture using a mandrel.

BACKGROUND

Manufacturing techniques can include forming material around a rotating mandrel to generate a part having the general shape of the mandrel. For example, in an automated tape laying or automated fiber placement technique, a mandrel can be coupled between a headstock and a tailstock and rotated while a fiber placement head applies a fiber tape or tows over the surface of the mandrel. After the fiber tape has set into a rigid form, such as after curing or cooling of an epoxy impregnated in the fiber tape, the mandrel is removed from the part.

However, because the mandrel is only supported at its ends by the headstock and tailstock, the downward pull of gravity can cause the mandrel to deform or "sag." The extent of mandrel deformation due to gravity increases for relatively long parts with narrow cross-sections, such as propeller blades, rotor blades, and wing spars. A mandrel can be further deformed due to other applied forces, such as pressure from a fiber placement head that is applying material to the mandrel. Such deformation of the mandrel can change as the mandrel is rotated and as the fiber placement head changes position around the mandrel. Parts that are formed by applying material to a deformed mandrel exhibit a higher variability, lower yield, and have increased residual strains.

SUMMARY

In a particular implementation, a system to manufacture an object includes a headstock, a tailstock, and a mandrel having a first end coupled to the headstock and a second end coupled to the tailstock. The system also includes an actuator coupled to at least one of the headstock, the tailstock, or the mandrel, the actuator operable to apply a force to at least one of the headstock, the tailstock, or the mandrel, to oppose deformation of the mandrel.

In another particular implementation, a device includes a mandrel and an actuator at least partially inside the mandrel and coupled to multiple attachment points of the mandrel to enable the actuator to apply a force to one or more of the attachment points to oppose deformation of the mandrel.

In another particular implementation, a method for manufacturing an object includes using a processor to perform operations including detecting a deformation of a mandrel and sending a command to adjust an actuator to apply a force to at least one of a headstock, a tailstock, or the mandrel. The force opposes deformation of the mandrel.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 1 is a diagram that illustrates a particular implementation of a system configured to compensate for deformation of a mandrel during manufacturing of an object.

FIG. 2 is a diagram of a particular implementation of components that can be implemented in the system of FIG. 1.

DETAILED DESCRIPTION

Figure 3:
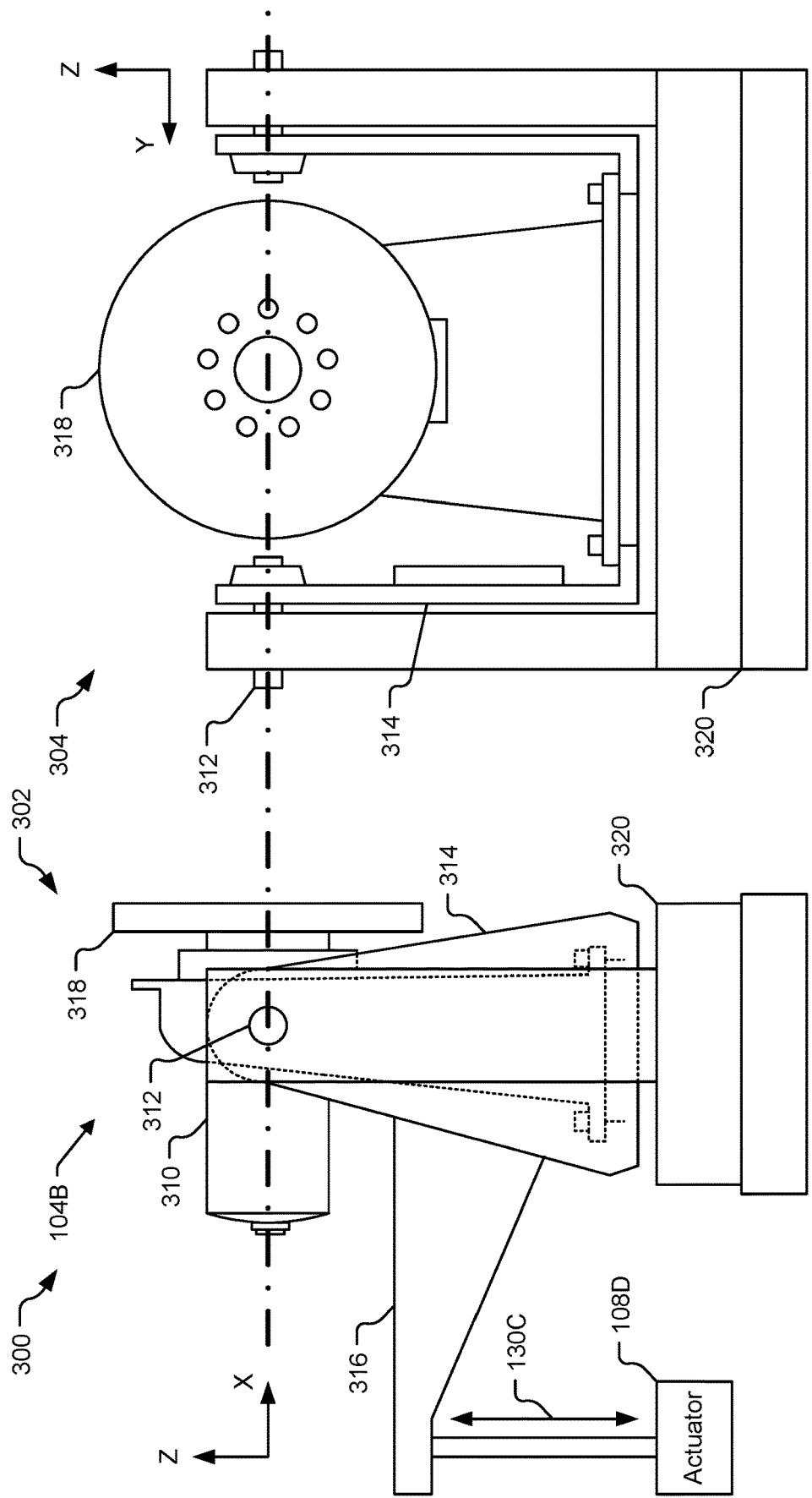
FIG. 3 is a diagram of another particular implementation of components that can be implemented in the system of FIG. 1.

Aspects disclosed herein present systems and methods to compensate for (e.g., reduce or eliminate) deformation of a mandrel during manufacturing of an object. For example, a mandrel can become deformed due to gravity or other external forces applied to the mandrel, such as contact with a fiber placement head. Deformation of the mandrel can cause an object formed using the mandrel to be misshapen or to exhibit an unacceptable variance from a physical specification for the object.

The described systems and methods include one or more actuators that are operated to compensate for deformation of a mandrel during manufacturing of an object. One or more deformation sensors are used to detect deformation of the object, and one or more actuators can be operated to impart a force to one or more of the headstock, the tailstock, or the mandrel that at least partially compensates for a deformation force that is experienced by the mandrel. As used herein, the term "force" includes interactions that, when unopposed, tend to cause or alter linear motion or deformation of an object, and can also encompass "moment" or "moment of force" and refer to interactions that tend to cause or alter rotational motion of an object. In some implementations, an actuator tilts the headstock to apply an upward force to a first end of the mandrel, tilts the tailstock to apply an upward force to a second end of the mandrel, or a combination thereof. An amount of tilt applied to the headstock, the tailstock, or both, can be based on an amount of deformation detected from the deformation sensors. The deformation can be determined in real-time during manufacture or can detected during a calibration procedure and used to generate actuator control data that is used during later manufacturing of the object. A technical effect of operating the one or more actuators to at least partially compensate for external forces acting on the mandrel enables object formation having improved accuracy (e.g., resulting in higher strength and lower defect rate) as compared to conventional techniques. A technical effect of embodiments herein include reduced waste and scrap. A technical effect of embodiments herein include reduced construction in building composite structure.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features are as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple actuators are illustrated and associated with reference numbers 108A and 108B. When referring to a particular one of these actuators, such as the actuator 108A, the distinguishing letter "A" is used. However, when referring to any arbitrary one of these actuators or to these actuators as a group, the reference number 108 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 to manufacture an object 170 (e.g., object 170A). The system 100 includes a headstock 104, a tailstock 106, a mandrel 102, a first actuator 108A, a second actuator 108B, and a processor 160. The mandrel 102 has a first end 110 coupled to the headstock 104 and a second end 112 coupled to the tailstock 106. The headstock 104 and the tailstock 106 are configured to rotate the mandrel 102 about an axis, such as to enable application of fiber (e.g., fiber tape or fiber tows) to the mandrel 102 for formation of the object 170A. For example, fiber may be placed on the mandrel 102, as the mandrel 102 is rotating, by a fiber placement head, as illustrated and described further with reference to FIG. 2. In some implementations, the object 170 corresponds to an aircraft part, such as a rotor blade, propeller blade, turbine blade, or wing spar, or a spacecraft part, such as described further with reference to FIGS. 6A-6B.

The processor 160, the first actuator 108A, the second actuator 108B, a first deformation sensor 150A, and a second deformation sensor 150B are interconnected, such as via one or more networks. In some implementations, the processor 160 is coupled to the deformation sensors 150 and to the actuators 108 via one or more wireless networks, one or more wireline networks, or any combination thereof, to enable data communications. In some implementations, the processor 160 is coupled to one or more of the first actuator 108A, the second actuator 108B, a first deformation sensor 150A, and a second deformation sensor 150B via an analog signal path (e.g., an electrical wire that enables a voltage, a current, or both, to be provided between components). For example, an output of the first deformation sensor 150A can be provided to the processor 160 as an analog current that is proportional to an amount of deformation detected by the first deformation sensor 150A, and the processor 160 can process the output of the first deformation sensor 150A via an analog-to-digital convertor (ADC).

The first actuator 108A is coupled to the headstock 104 and is operable to apply a force 130A to the headstock 104. The first actuator 108A is operable to change an orientation of the headstock 104. For example, the first actuator 108A can include a swivel component, a tilt component, one or more other components, or a combination thereof, to enable a change of orientation of the headstock 104. As used herein, "changing an orientation" of the headstock 104 refers to adjusting the axis of rotation of the headstock 104 (i.e., the axis about which the first end 110 of the mandrel 102 is rotated) and does not refer to conventional rotation of the mandrel 102 about its axis.

The force 130A has a first component 132A that opposes a deformation force 120A on the mandrel 102. For example, the force 130A is illustrated as having the first component 132A in a vertical direction (e.g., upward in the example of FIG. 1), and a second component 134A that is in a horizontal direction. The actuator 108A can cause the headstock 104 to tilt upward to provide the first component 132A of the force 130A in an upward direction to at least partially counter deformation of the mandrel 102 caused by the downward pull of the force 120A, which can correspond to a force due to gravity. For example, in an implementation in which the mandrel 102 is relatively long and thin, such as for a wing spar or a propeller, the mandrel 102 can tend to deform responsive to gravity, such as by tending to sag toward the ground.

The second actuator 108B is coupled to the tailstock 106 and is operable to apply a force 130B to the tailstock 106 to change an orientation of the tailstock 106. For example, the second actuator 108B can include a swivel component, a tilt component, one or more other components, or a combination thereof, to enable a change of orientation of the tailstock 106. As used herein, "changing an orientation" of the tailstock 106 refers to adjusting the axis of rotation of the tailstock 106 (i.e., the axis about which the second end 112 of the mandrel 102 is rotated) and does not refer to conventional rotation of the mandrel 102 about its axis.

The force 130B has a first component 132B that opposes the deformation force 120A on the mandrel 102. For example, the force 130B is illustrated as having the first component 132B in a vertical direction (e.g., upward in the example of FIG. 1), and a second component 134B that is in a horizontal direction. The actuator 108B can cause the tailstock 106 to tilt upward to provide the first component 132B of the force 130B in an upward direction to at least partially counter deformation of the mandrel 102 caused by the downward pull of the force 120A. In some implementations, the force 130B has a magnitude approximately equal to the magnitude of the force 130A, such as when deformation of the mandrel 102 is approximately symmetrical (e.g., the mandrel 102 deforms into a parabolic-type or catenary-type shape). In other implementations, the magnitude of the force 130A is not substantially equal to the magnitude of the force 130B, such as when a location of largest deflection of the mandrel 102 is not centered between the headstock 104 and the tailstock 106.

The deformation sensors 150 are configured to detect deformation of the mandrel 102. For example, the first sensor 150A is coupled to the mandrel 102, such as fastened to an internal surface of the mandrel 102, and is configured to detect deformation of the mandrel 102, such as by detecting a deflection, stretch, strain, bend, twist, or other flexion of the mandrel 102 in the vicinity of the first sensor 150A. The first sensor 150A is configured to generate a first sensor input 152A to the processor 160 indicating an extent of detected deformation, a direction or type of deformation (e.g., a stretch, a compression), or a combination thereof, of a portion or surface of the mandrel 102. The second sensor 150B is external to the mandrel 102 and configured to detect deformation of the mandrel 102, such as via optical imaging, radar, lidar, one or more other sensing techniques, or a combination thereof. In a particular implementation, the second sensor 150B includes a laser interferometer or lidar metrology machine. The second sensor 150B is configured to generate a second sensor input 152B to the processor 160 indicating deformation characteristics as detected by this second sensor 150B.

The processor 160 is coupled to the first actuator 108A and the second actuator 108B and is further coupled to receive the first sensor input 152A and the second sensor input 152B. The processor 160 can be coupled to a memory that stores instructions that are executable by the processor 160 to initiate, perform or control operations to aid in reducing deformation of the mandrel 102, such as described further with reference to FIG. 8. The processor 160 can be implemented as a single processor or as multiple processors, such as in a multi-core configuration, a multi-processor configuration, a distributed computing configuration, a cloud computing configuration, or any combination thereof. In some implementations, one or more of the functions performed by the processor 160 are implemented using dedicated hardware, firmware, or a combination thereof.

The processor 160 is configured to control the first actuator 108A, the second actuator 108B, or both, based on detected deformation of the mandrel 102. In some implementations, the processor 160 is configured to control the actuator 108A and the actuator 108B further based on rotation of the mandrel 102. For example, the processor 160 can process the sensor input 152 to determine an extent and location of deformation of the mandrel 102 based on a particular rotational orientation of the mandrel 102. For example, a greater amount of deformation of the mandrel 102 can be detected in a relatively thin portion of the mandrel while the mandrel 102 is in particular rotational positions and a lesser amount of deformation of the mandrel 102 can be detected while the mandrel 102 is in other rotational positions.

The processor 160 is configured to detect deformation of the mandrel 102 and to send a first command 162A to the first actuator 108A and a second command 162B to the second actuator 108B. The first command 162A causes the first actuator 108A to apply the force 130A to the headstock 104. The second command 162B causes the second actuator 108B to apply the second force 130B to the tailstock 106. For example, the first command 162 causes the first actuator 108A to change an orientation (e.g., tilt) of the headstock 104, and the second command 162B causes the second actuator 108B to change an orientation of the tailstock 106.

The first actuator 108A, the second actuator 108B, or a combination thereof, can apply the first force 130A, the second force 130B, or a combination thereof, to at least partially compensate for a tendency of the mandrel 102 to deform responsive to external forces. Although the deformation force 120A due to gravity is illustrated in FIG. 1, other external forces can be applied to the mandrel 102 that may cause or tend to cause deformation of the mandrel 102, such as a force applied by a fiber placement head, as described further with reference to FIG. 2. By generating the first force 130A and the second force 130B having the components 132A, 132B that oppose the deformation force 120A due to gravity, a deformation of the mandrel 102 due to gravity may be reduced or eliminated, resulting in a higher accuracy of the object 170A that is formed via application of material to the exterior of the mandrel 102. As a result, improved accuracy, improved strength, and a higher production yield may be obtained as compared to production systems in which a mandrel is allowed to warp or sag responsive to externally applied forces such as gravity.

Although the headstock 104, the tailstock 106, the mandrel 102, the first actuator 108A, the second actuator 108B, the first deformation sensor 150A, the second deformation sensor 150B, and the processor 160 are depicted as separate components, in other implementations the described functionality of two or more of the headstock 104, the tailstock 106, the mandrel 102, the first actuator 108A, the second actuator 108B, the first deformation sensor 150A, the second deformation sensor 150B, and the processor 160 can be performed by a single component. In some implementations, each of the first deformation sensor 150A, the second deformation sensor 150B, and the processor 160 can be represented in hardware, such as via an application-specific integrated circuit (ASIC) or a field-programmable gate array (FPGA), or the operations described with reference to the elements may be performed by a processor executing computer-readable instructions.

Although FIG. 1 illustrates particular examples for clarity of explanation, such examples are not to be considered as limitations. For example, although the system 100 is described as including the first deformation sensor 150A and the second deformation sensor 150B, in other examples the system 100 omits the first deformation sensor 150A, omits the second deformation sensor 150B, or includes one or more other sensors capable of detecting a deformation of the mandrel 102, in addition to, or instead of, one or both of the deformation sensor 150A and the second deformation sensor 150B.

FIG. 2 depicts an example 200 showing components that can be implemented in the system 100 of FIG. 1. A headstock 104A is illustrated coupled to the mandrel 102. The mandrel 102 is acted upon by multiple deformation forces, including a force 120B due to contact with a fiber placement head 202, and a force 120A due to gravity. An actuator 108C is illustrated coupled to the headstock 104A. The actuator 108C includes a swivel component 212 coupled to an electrical drive 213 that is configured to turn a shaft 214 upon which the headstock 104A is mounted. The actuator 108C also includes a tilt component 210 (e.g., mechanically coupled to the electrical drive 213 or to another drive component) that is configured to tilt the headstock 104A about a pivot to adjust a face of the headstock 104A upward or downward. A reference orthographic coordinate system 220 is illustrated having an X-axis in the direction from the headstock 140A to the tailstock 106, a Z-axis in an upward direction (opposite to the direction of the force of gravity) and a Y-axis orthogonal to the X-axis and the Z-axis.

The swivel component 212 is configured to swivel the shaft 214 by application of a force, illustrated as an arrow 132D, resulting in a force to the headstock 104A in a direction that opposes the force 120B applied by the fiber placement head 202. The tilt component 210 is configured to provide an upward force, illustrated as an arrow 132C, to cause the headstock 104A to apply a force to the mandrel 102 in a direction that opposes the force 120A due to gravity. In particular, the swivel component 212 of the actuator 108C is configured to apply force to turn the headstock 104A about the Z-axis, and the tilt component 210 of the actuator 108C is configured to turn the headstock 104A about the Y-axis.

In this manner, the headstock 104A can be controlled to at least partially offset, or eliminate, deformation due to gravity, deformation due to contact with the fiber placement head 202, deformation due to contact with one or more other elements, deformation due to one or more additional forces externally applied to the mandrel 102, or a combination thereof.

FIG. 3 depicts another example 300 of components that can be implemented in the system 100 of FIG. 1. A side view 302 and a front view 304 illustrate a headstock 104B mounted on a swing 314 that is coupled to an actuator 108D. The headstock 104B includes a motor body 310 coupled to a faceplate 318. The faceplate 318 is configured to be attached to a mandrel 102 during manufacturing of an object 170 and to be detached from the mandrel 102 to enable the mandrel to be removed from the object 170 after application of fiber or other materials to the mandrel 102.

The motor body 310 is coupled to the swing 314, and the swing 314 is pivotally coupled to a support 320 via an axle 312. For example, the motor body 310 and the swing 314 can pivot about the axle 312 relative to the support 320 (e.g., pivot about the Y-axis). The swing 314 is rigidly coupled via a control arm 316 to the actuator 108D. The actuator 108D is configured to apply a force 130C (e.g., an upward or downward force) to the control arm 316 to selectively adjust a tilt of the headstock 104B. In the example 300, an existing headstock 104B and support 320 can be retrofitted with the swing 314, the control arm 316, and the actuator 108D to enable reduction or elimination of deformation of a mandrel due to external forces, such as described previously with reference to FIGS. 1 and 2.

Figure 4:
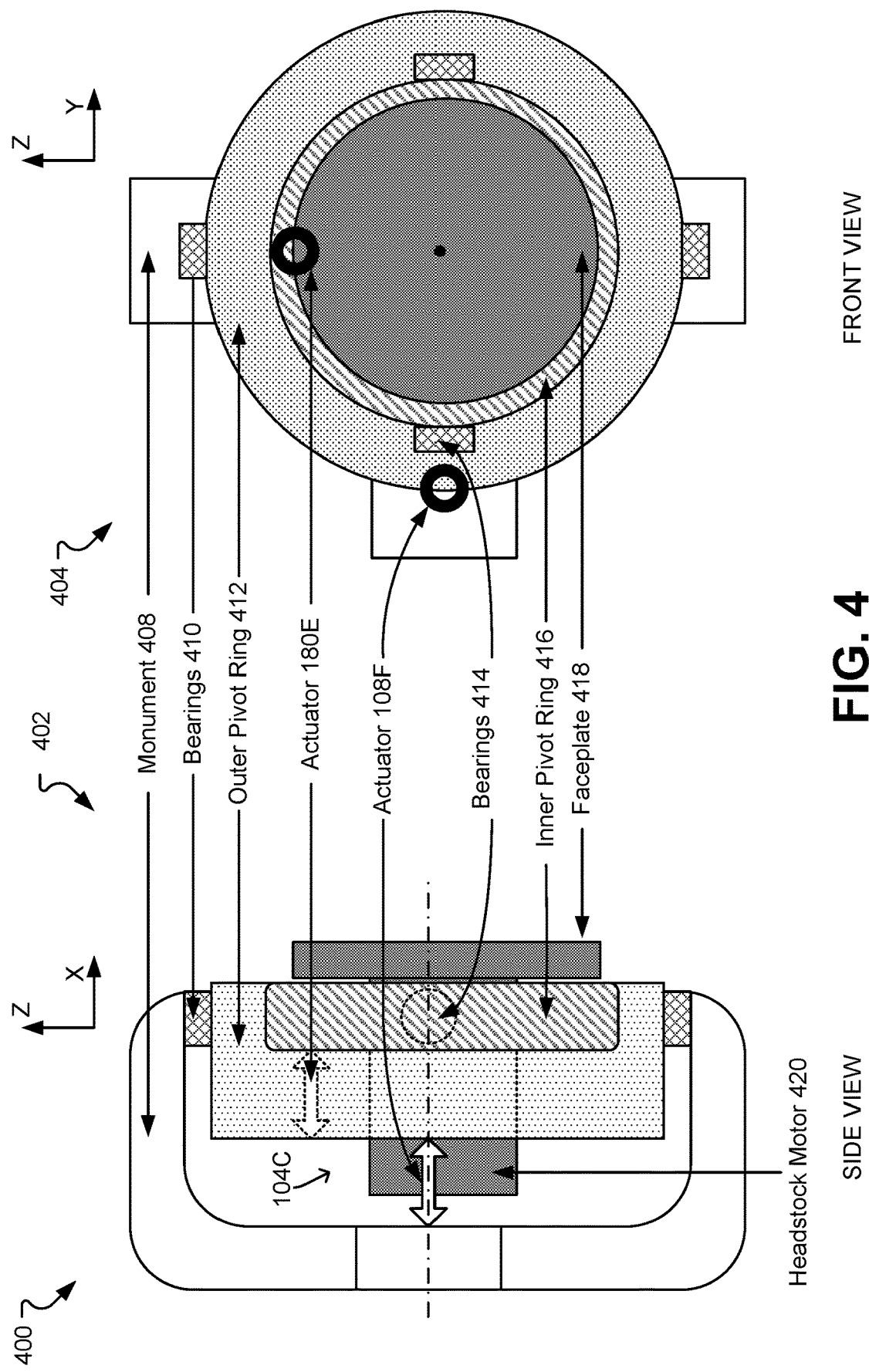
FIG. 4 is a diagram of another particular implementation of components that can be implemented in the system of FIG. 1.

FIG. 4 depicts another example of a headstock and actuator assembly 400 that can be implemented in the system 100 of FIG. 1. A side view 402 and a front view 404 illustrate a headstock 104C that includes a motor 420 coupled to a faceplate 418. The headstock 104C is coupled to an inner pivot ring 416. The inner pivot ring 416 is coupled to an outer pivot ring 412 via bearings 414 that enable the headstock 104C to pivot about the Y-axis (in a reference frame of the outer pivot ring 412). The outer pivot ring 412 is coupled to a monument 408 (e.g., a stationary housing) via bearings 410 that enable the outer pivot ring 412 to pivot about the Z-axis. A first actuator 108E is configured to cause the inner pivot ring 416 to pivot about the Y-axis (e.g., to tilt the headstock 104C upward or downward). A second actuator 108F is configured to cause the outer pivot ring 412 to pivot about the Z-axis (e.g., to swivel the headstock 104C horizontally).

Although FIGS. 2-4 illustrate an actuator 108 coupled to a headstock 104 configured to be coupled to a first end of a mandrel 102, in other implementations both the headstock 104 and the tailstock 106 are coupled to respective actuators, such as described previously with reference to FIG. 1. In some implementations, a tailstock 106 is coupled to the other end of the mandrel 102 but is not coupled to an actuator 108 and is instead a conventional tailstock. In such implementations, a substantial portion or all of the deformation of the mandrel 102 due to externally applied forces 120 is compensated by changes in orientation of the headstock 104 alone. In other implementations, a tailstock 106 is coupled to an actuator 108 to at least partially compensate for the force(s) 120, and the headstock 104 corresponds to a conventional headstock that is not coupled to an actuator. Significant reduction of deformation can be attained in single-actuator implementations and in multi-actuator implementations.

Figure 5:
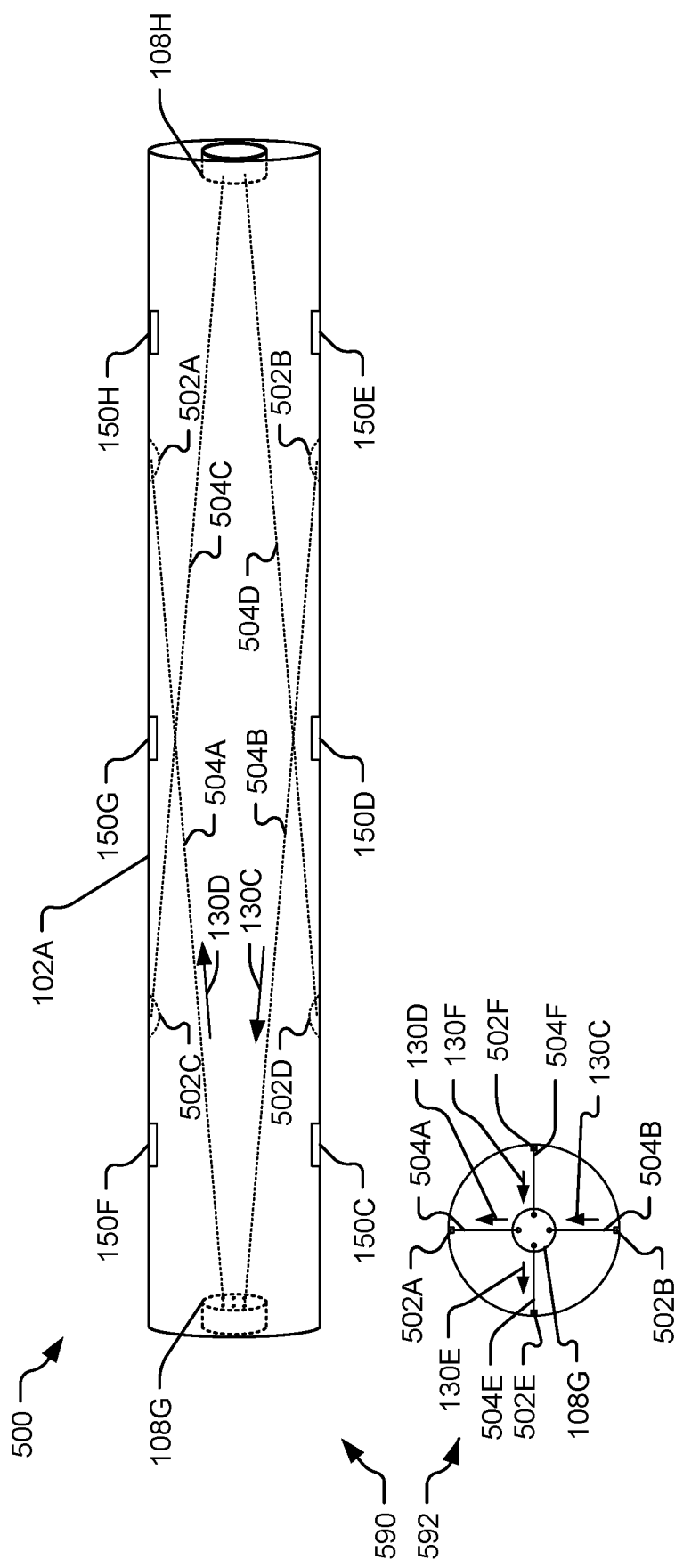
FIG. 5 is a diagram of a particular implementation of a device that includes an actuator at least partially inside a mandrel.

Although FIGS. 1-4 illustrate and describe actuators 108 as being coupled to a headstock 104 or the tailstock 106, in one or more implementations, an actuator 108 is implemented at least partially inside a mandrel 102, such as described further with reference to FIG. 5.

FIG. 5 depicts an example of a device 500 that includes a mandrel 102 (e.g., a mandrel 102A), a first actuator 108E, and a second actuator 108F. The first actuator 108E is at least partially inside the mandrel 102A and is coupled to multiple attachment points 502 of the mandrel 102A, illustrated as a first attachment point 502A and a second attachment point 502B. The device 500 is depicted in a side view 590 and a cross-sectional view 592.

The side view 590 illustrates that the first actuator 108G is coupled to the first attachment point 502A via a first coupling member 504A and is coupled to the second attachment point 502B via a second coupling member 504B. For example, in some implementations, each of the coupling members 504A, 504B is a rigid bar or shaft that can be pulled by the actuator 108E to apply a tensional force 130C that tends to pull the second attachment point 502B toward the first actuator 108E. Similarly, the actuator 108G can be configured to push the coupling member 504A to apply a compressional force 130D that tends to push the attachment point 502A away from the first actuator 108G.

An upward component of the tensional force 130C applied to the attachment point 502B, can at least partially oppose a deformation force due to gravity on the mandrel 102A. Similarly, an upward component of the compressional force 130D applied to the attachment point 502A can oppose a downward pull of gravity on the mandrel 102A. Application of the tensional force 130C to the attachment point 502B, the compressional force 130D to the attachment point 502A, or a combination thereof, enable the actuator 108G to at least partially compensate for deformation of the mandrel 102A due to gravity or other external forces applied to the mandrel 102A.

The second actuator 108H is coupled to a third attachment point 502C via a third coupling member 504C and is coupled to a fourth attachment point 502D via a fourth coupling member 504D. For example, in some implementations, each of the coupling members 504C, 504D is a rigid bar or shaft that can be pulled or pushed by the actuator 108H to apply a tensional force or a compressional force in a similar manner as described for the first actuator 108G.

The device 500 further includes deformation sensors 150 coupled to the mandrel 102A. For example, deformation sensors 150C, 150D, 150E, 150F, 150G, and 150H are illustrated as attached to an interior surface of the mandrel 102A and are configured to generate data indicating deformation detected within a region of the respective deformation sensor 150. The deformation sensors 150C-150F can individually generate sensor inputs 152 for the processor 160, such as via wireless signaling or via an electrical wiring through a rotor attachment to a headstock 104 or tailstock 106. Alternatively, a processor, such as the processor 160 of FIG. 1, can also be implemented within the mandrel 102A in some implementations.

The cross-sectional view 592 illustrates the actuator 108G coupled to the first attachment point 502A via the first coupling member 504A, coupled to the second attachment point 502B via the second coupling member 504B, coupled to a fifth attachment point 502E via a fifth coupling member 504E, and coupled to a sixth attachment point 502F via a sixth coupling member 504F. The actuator 108G is configured to apply forces to the mandrel 102A by pushing or pulling on the various coupling members 504A, 504B, 504E, and 504F. To illustrate, the actuator 108G can apply forces along two generally orthogonal planes: a first plane that includes the coupling members 504E and 504F (a horizontal plane in FIG. 5) and a second plane that includes the coupling members 504A and 504B (a vertical plane in FIG. 5).

The actuator 108G is configured to apply the tensional force 130C to the second attachment point 502B and the compressional force 130D to the first attachment point 502A, such as to compensate for deformation of the mandrel 102A due to a downward pull of gravity, and is also configured to apply a second compressional force 130E and a second tensional force 130F, such as to compensate for a horizontal component of deformation of the mandrel 102A due to contact with a fiber placement head. As the mandrel 102A rotates, the actuator 108G can increase, decrease, or change direction of the forces applied to each of the coupling members 504A, 504B, 504E, and 504F to continuously provide compensation for a downward pull of gravity, for one or more other externally applied forces, or a combination thereof, as the mandrel 102A rotates.

By including the deformation sensors 150, the actuators 108G and 108H, and the coupling members 504 within the mandrel 102A (or at least partially within the mandrel 102A), the mandrel 102A can be used with a conventional headstock and tailstock assembly in which the headstock and tailstock are not configured to be adjusted responsive to detected mandrel deformation. In this manner, the device 500 provides a "smart" mandrel 102A that selectively adjusts tensions and compressions of internal components responsive to detection of deformation as the mandrel 102A is rotated about its axis and pressed upon by external components during manufacturing.

Although the coupling members 504 are described as being rigid components (e.g., metal rods) that are configured to alternatively provide a compressional force and a tensional force to the mandrel 102A at respective attachment points 502 during rotation of the mandrel 102A, in other implementations the coupling members 504 are configured to provide a compressional force only or a tensional force only. For example, in a particular implementation, the coupling members 504 include cables that are configured to provide tensional force but not compressional force.

Although the device 500 includes two actuators 108G, 108H, in other implementations the device 500 includes a single actuator. Although multiple representative coupling members 504 are illustrated to enable each actuator 108G, 108H, to push or pull on various attachment points 502 of the mandrel 102A, it should be understood that any number of coupling members 504 can be coupled to each actuator 108, such as three coupling members 504 spaced at approximately 120-degree angular offsets about a rotation axis of the mandrel 102A, twelve coupling members 504, or any other number of coupling members 504 for each of the actuators 108G, 108H.

In addition to the method of applying the internal moments with forces from the actuators 108G and 108H, located at the ends of the mandrel 102A, to the interior stations (attachment points 502), other methods are also possible. One technique includes applying tension/compression forces directly between the attachment points 502 of the mandrel 102A, such as a force between attachment points 502C and 502A, and another force between attachment points 502D and 502B. One specific implementation of producing such internal forces includes using channels in the wall of the mandrel 102A which are pressurized with hydraulic fluid. In other implementations, electric jackscrews or discrete hydraulic actuators interior to the mandrel 102A are used, as illustrative, non-limiting examples.

Figure 6A:
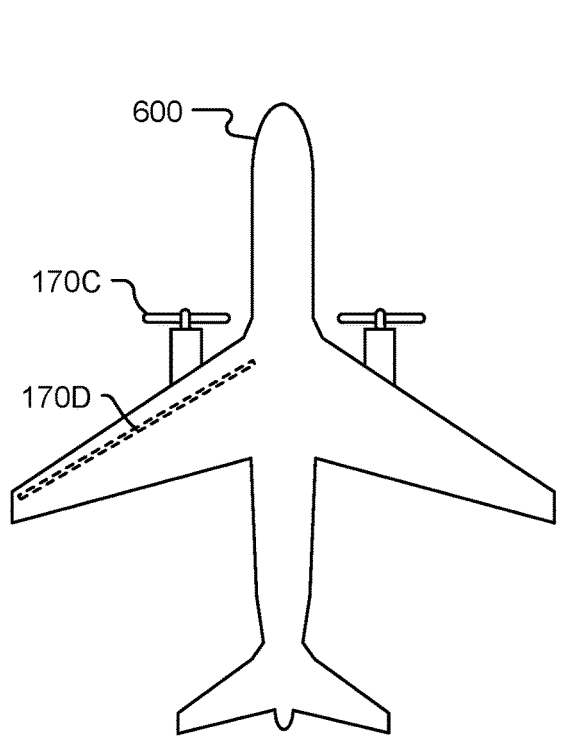
FIG. 6A is a diagram of an implementation of a vehicle that incorporates one or more objects formed by the system of FIG. 1 or using the device of FIG. 5.

FIG. 6A illustrates an example of a vehicle, illustrated as an airplane 600, that includes one or more components that are manufactured using the systems or devices described in FIGS. 1-5 to compensate for mandrel deformation during application of fiber or other composite materials. The components include objects 170, such as a representative propeller blade 170C and a representative wing spar 170D. In other implementations, the airplane 600 can include one or more additional components that are manufactured in accordance with the techniques described herein.

Figure 6B:
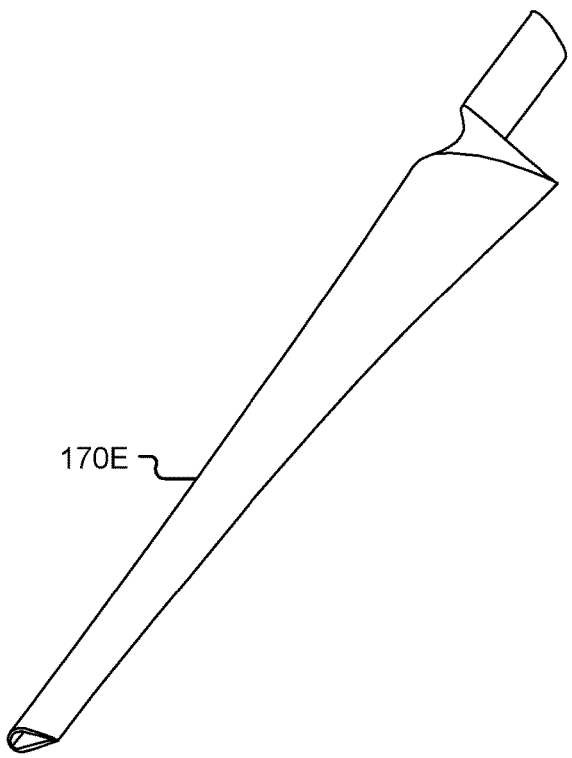
FIG. 6B is a diagram of an implementation of an object formed by the system of FIG. 1 or using the device of FIG. 5.

Although the airplane 600 is depicted as an example of a vehicle that can incorporate objects 170, in other implementations the vehicle can include a land-based craft, such as an automobile, a water-based craft, such as a ship, or a space-based craft, such as a spaceship or a satellite. FIG. 6B depicts a representative turbine blade 170E manufactured using the systems or devices described in FIGS. 1-5 to compensate for mandrel deformation during application of fiber or other composite materials. In other implementations, one or more objects 170 can be incorporated in a building or other structure, as illustrative, non-limiting examples.

Figure 7:
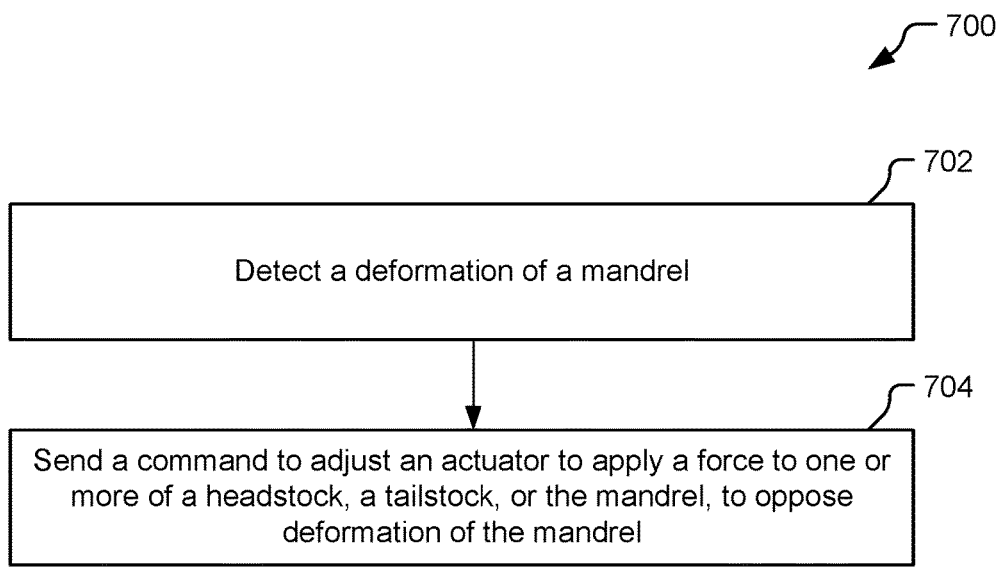
FIG. 7 is a diagram of a particular implementation of a method of compensating for deformation of a mandrel.

FIG. 7 is a flow chart of a method 700 for manufacturing an object. For example, the method 700 can be performed by the system 100 of FIG. 1. The method 700 includes using a processor (e.g., the processor 160) to perform operations including detecting a deformation of a mandrel, at 702. For example, mandrel deformation can be detected based on sensor input 152, such as from an internal deformation sensor 150A or 150C-150H, from an external deformation sensor 150B, or a combination thereof. To illustrate, in some implementations, the method 700 also includes receiving a sensor input from at least one deformation sensor of the mandrel and processing the sensor input to detect the deformation. For example, the sensor inputs 152 from deformation sensors 150 are received at the processor 160 and processed by the processor 160 to detect the deformation.

The method 700 also includes, at 704, sending a command to adjust an actuator to apply a force to one or more of a headstock, a tailstock, or the mandrel, to oppose deformation of the mandrel. In some implementations, the command causes the actuator to change an orientation of the headstock. In some implementations, the command causes the actuator to change an orientation of the tailstock. In the example of FIG. 1, the processor 160 sends the command 162A to adjust the actuator 108A to apply the force 130A to the headstock 104 and sends the command 162B to adjust the actuator 108B to apply the force 130B to the tailstock 106. In some implementations, the command causes the actuator to apply at least one of a tensional force or a compressional force on the mandrel. In the example of FIG. 5, a processor external to the mandrel 102A or internal to the mandrel 102A sends commands to adjust the actuator 108E to apply the compressional force 130D and the tensional force 130C to the mandrel 102A. In an example, the force has a first component (e.g., the tilt component 210 of FIG. 2) that opposes a gravity component of a deformation force and has a second component (e.g., the swivel component 212 of FIG. 2) that opposes a fiber placement head component of the deformation force.

In some implementations, the method 700 includes controlling the actuator based on rotation of the mandrel and detected deformation of the mandrel. To illustrate, in an automated manufacturing process, deformation detection and actuator adjustments can be recorded as a function of rotation angle or time during a calibration operation that is performed prior to a production run for an object. The recorded data can be used to perform actuator control based on rotation of the mandrel during the production run, enabling the deformation sensors to be omitted during production (or a reduced number of deformation sensors to be used) and reducing an amount of processing resources used to determine the commands 162 or other control signals (e.g., because processing of the sensor inputs 152 to determine deformation can be bypassed in favor of using the recorded data of the calibration operation).

By detecting deformation of the mandrel and controlling one or more actuators to at least partially offset forces that are causing the deformation, the mandrel can exhibit reduced overall deformation during manufacture of the object. As a result, the object can be created with higher strength, fewer defects, and a higher production yield (and therefore lower production cost) as compared to conventional systems in which deformation of the mandrel is not actively mitigated.

Figure 8:
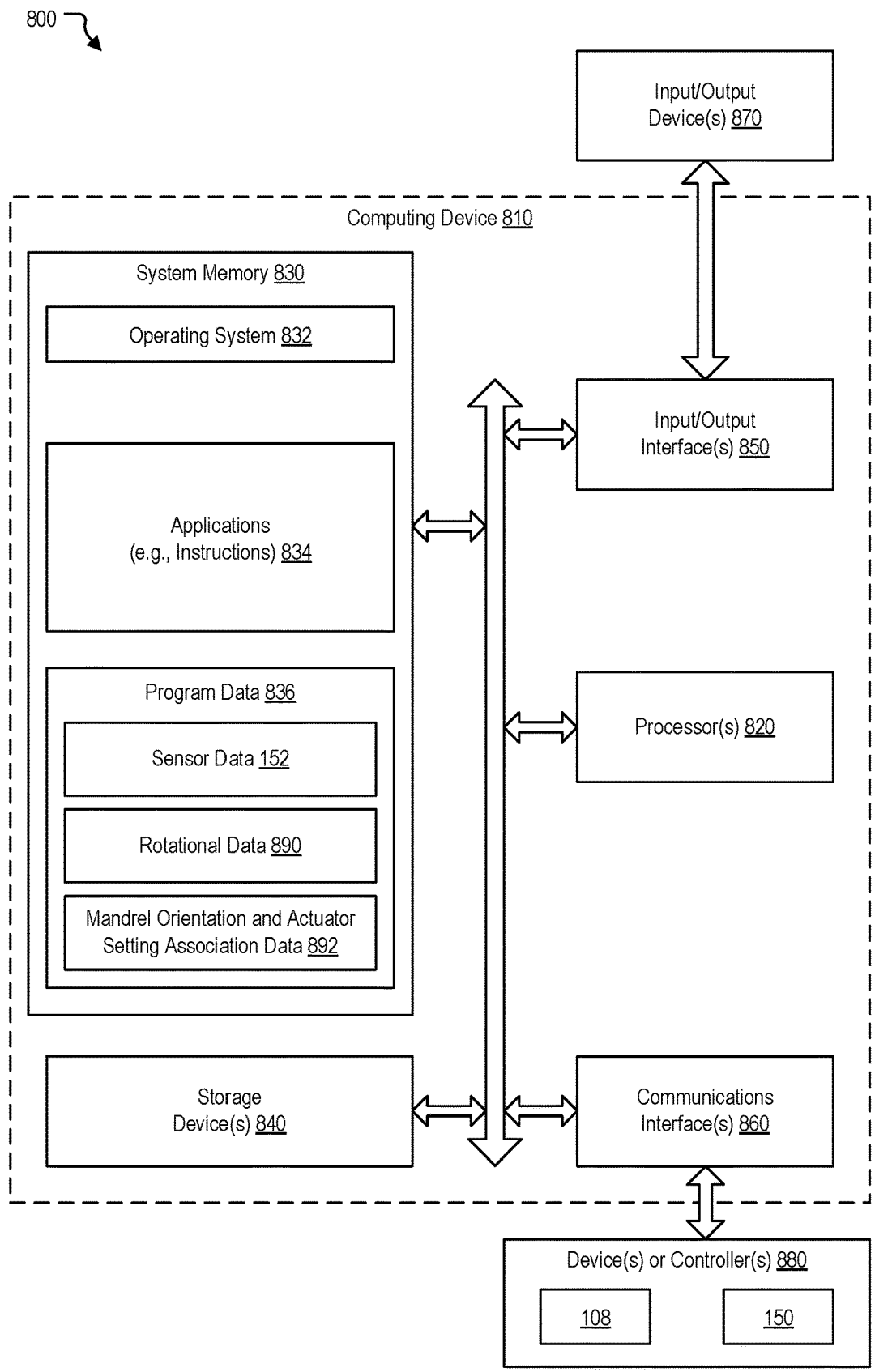
FIG. 8 is a block diagram of a computing environment including a computing device configured to support aspects of computer-implemented methods and computer-executable program instructions (or code) according to the present disclosure.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7.

The computing device 810 includes one or more processors 820. The processor(s) 820 are configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which may include a basic input/output system for booting the computing device 810 as well as a full operating system to enable the computing device 810 to interact with users, other programs, and other devices. The system memory 830 stores system (program) data 836, such as rotational data 890 indicating the rotation rate or angular position of the mandrel 102, the sensor inputs 152, data 892 that associates multiple rotational orientations of the mandrel 102 with actuator settings, or a combination thereof.

The system memory 830 includes one or more applications 834 (e.g., sets of instructions) executable by the processor(s) 820. As an example, the one or more applications 834 include instructions executable by the processor(s) 820 to initiate, control, or perform one or more operations described with reference to FIGS. 1-7. To illustrate, the one or more applications 834 include instructions executable by the processor(s) 820 to initiate, control, or perform one or more operations described with reference to the processor 160, the actuators 108, or a combination thereof.

In a particular implementation, the system memory 830 includes a non-transitory, computer readable medium storing the instructions that, when executed by the processor(s) 820, cause the processor(s) 820 to initiate, perform, or control operations to compensate for deformation of a mandrel. In an implementation, the operations include detecting a deformation of a mandrel and sending a command to adjust an actuator to apply a force to at least one of a headstock, a tailstock, or the mandrel, the force having a component that opposes a deformation force on the mandrel.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, include tangible non-volatile computer-readable media. In a particular aspect, one or more of the storage devices 840 are external to the computing device 810.

The one or more input/output interfaces 850 that enable the computing device 810 to communicate with one or more input/output devices 870 to facilitate user interaction. For example, the one or more input/output interfaces 850 can include a display interface, an input interface, or both. The processor(s) 820 are configured to communicate with devices or controllers 880 via the one or more communications interfaces 860. For example, the one or more communications interfaces 860 can include a network interface. The devices or controllers 880 can include, for example, the actuator(s) 108, the deformation sensor(s) 150, one or more other devices, or any combination thereof.

In conjunction with the described systems and methods, an apparatus for manufacturing an object is disclosed that includes means for detecting a deformation of a mandrel. In some implementations, the means for detecting a deformation of a mandrel corresponds to one or more deformation sensor 150, the processor 160, the computing device 810, one or more other circuits or devices configured to detect a deformation of a mandrel, or a combination thereof.

The apparatus also includes means for sending a command to adjust an actuator to apply a force to at least one of a headstock, a tailstock, or the mandrel, to oppose a deformation of the mandrel. For example, the means for sending the command can correspond to the processor 160, the computing device 810, one or more communications interfaces 860 of FIG. 8, one or more other devices configured to send a command to adjust an actuator to apply a force to at least one of a headstock, a tailstock, or the mandrel, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system to manufacture an object, the system comprising:
   a headstock;
   a tailstock;
   a mandrel having a first end coupled to the headstock and a second end coupled to the tailstock;
   one or more processors configured to detect a deformation of the mandrel; and
   an actuator coupled to one or more of the headstock, the tailstock, or the mandrel, the actuator operable to apply a force to the one or more of the headstock, the tailstock, or the mandrel, to oppose the detected deformation of the mandrel.

2. The system of claim 1, wherein the force has a component that opposes a deformation force that includes a force due to gravity.

3. The system of claim 1, wherein the force has a component that opposes a deformation force that includes a force due to contact with a fiber placement head.

4. The system of claim 1, wherein the actuator is coupled to the headstock and is operable to change an orientation of the headstock.

5. The system of claim 1, wherein the actuator is coupled to the tailstock and is operable to change an orientation of the tailstock.

6. The system of claim 1, wherein the actuator is coupled to the mandrel and is operable to apply one or more of a tensional force or a compressional force on the mandrel.

7. The system of claim 6, wherein the actuator is further operable to apply one or more of a second tensional force or a second compressional force on the mandrel.

8. The system of claim 1, wherein the mandrel includes deformation sensors configured to detect deformation of the mandrel.

9. The system of claim 1, wherein the one or more processors are coupled to the actuator and configured to control the actuator based on rotation of the mandrel and detected deformation.

10. The system of claim 1, wherein the object corresponds to an aircraft part or a spacecraft part.

11. A device comprising:
    a mandrel;
    a sensor configured to detect deformation of the mandrel; and
    an actuator at least partially inside the mandrel and coupled to multiple attachment points of the mandrel to enable the actuator to apply a force to one or more of the attachment points to oppose the detected deformation of the mandrel.

12. The device of claim 11, wherein the force includes a compressional force.

13. The device of claim 11, wherein the force includes a tensional force.

14. The device of claim 11, wherein the deformation sensor is coupled to the mandrel.

15. A method for manufacturing an object, the method comprising:
   using a processor to perform operations including:
   detecting a deformation of a mandrel; and s
   ending a command to adjust an actuator to apply a force to one or more of a headstock, a tailstock, or the mandrel, to oppose deformation of the mandrel.

16. The method of claim 15, further comprising: receiving a sensor input from one or more deformation sensor of the mandrel; and processing the sensor input to detect the deformation.

17. The method of claim 15, wherein the command causes the actuator to change an orientation of one or more of the headstock or the tailstock.

18. The method of claim 15, wherein the command causes the actuator to apply one or more of a tensional force or a compressional force on the mandrel.

19. The method of claim 15, further comprising controlling the actuator based on rotation of the mandrel and detected deformation of the mandrel.

20. The method of claim 15, wherein the force has a first component that opposes a gravity component of a deformation force and has a second component that opposes a fiber placement head component of the deformation force.

* * * * *